June 27, 1961 R. HAPPE 2,989,995
COMPOSITE AIR-DIRECTING AND HEAT-DISSIPATING GEAR HOUSINGS
Filed June 17, 1959 2 Sheets-Sheet 1

INVENTOR.
Reynold Happe
BY
*Marshall J. Breen*
ATTORNEY

June 27, 1961 R. HAPPE 2,989,995
COMPOSITE AIR-DIRECTING AND HEAT-DISSIPATING GEAR HOUSINGS
Filed June 17, 1959 2 Sheets-Sheet 2

INVENTOR.
Reynold Happe
BY
Marshall J. Breen
ATTORNEY

United States Patent Office 2,989,995
Patented June 27, 1961

2,989,995
COMPOSITE AIR-DIRECTING AND HEAT-DISSIPATING GEAR HOUSINGS
Reynold Happe, Princeton, N.J., assignor to The Singer Manufacturing Company, Elizabeth, N.J., a corporation of New Jersey
Filed June 17, 1959, Ser. No. 821,018
1 Claim. (Cl. 143—157)

This invention relates to a gear housing for electrically-driven tools and more particularly to a composite gear housing which combines structure for directing the flow of ventilating air with structure for transferring the heat generated within said housing to the air.

In the art of electrically-driven tools, it is customary to use the ventilating air to clear the cuttings away from the tool. This has heretofore in general been accomplished by placing the air exhaust ports in the vicinity of the area to be cleared without thought being given to the path by which the air reaches said ports. Much heat is generated in the gear transmissions used in these tools, and the gear-containing housings, being sealed against grease leakage, are difficult to cool adequately.

It is an object of this invention therefore to provide a unitary gear housing in which a gear-containing portion is supported by a plurality of ribs so shaped as to confine and direct the air for accurate delivery to the area to be cleared, and so placed as to serve as heat-dissipating fins to transfer heat readily from the gear-containing portion to the air.

With this and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 1:
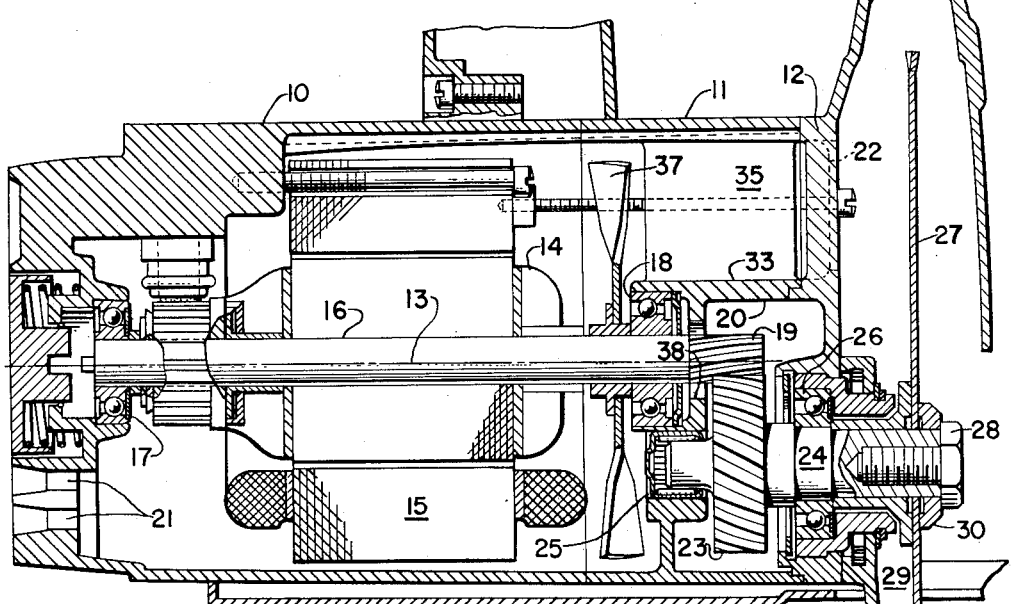
FIG. 1 is a vertical sectional view taken through a tool embodying the invention.

Referring to FIG. 1, an electric hand saw is shown in which the tool body comprises a motor housing 10, a gear housing 11, and a stationary blade guard 12 joined together in longitudinal alignment substantially on the axis 13 of the rotor 14 of an electric motor 15 secured within the motor housing 10. A rotor shaft 16 is journaled at the commutator-end in a bearing 17 secured in the motor housing 10. The other end of the rotor shaft 16 is journaled in a bearing 18 secured in the gear housing and extends through an apertured portion 38 with a splined terminal portion 19 reaching within a gear-containing portion 20 of the gear housing 11.

Figure 3:
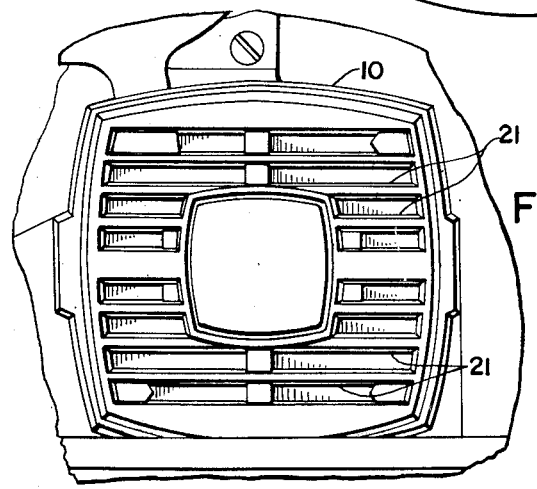
FIG. 3 is a fragmentary left-hand elevational view of the tool shown in FIG. 1.

Air inlet ports 21, as seen best in FIG. 3, are formed in the commutator-end of the motor housing 10 and a fan 37 is mounted for rotation with the rotor shaft 16 at a point just within the gear housing 11 as shown.

Figure 2:
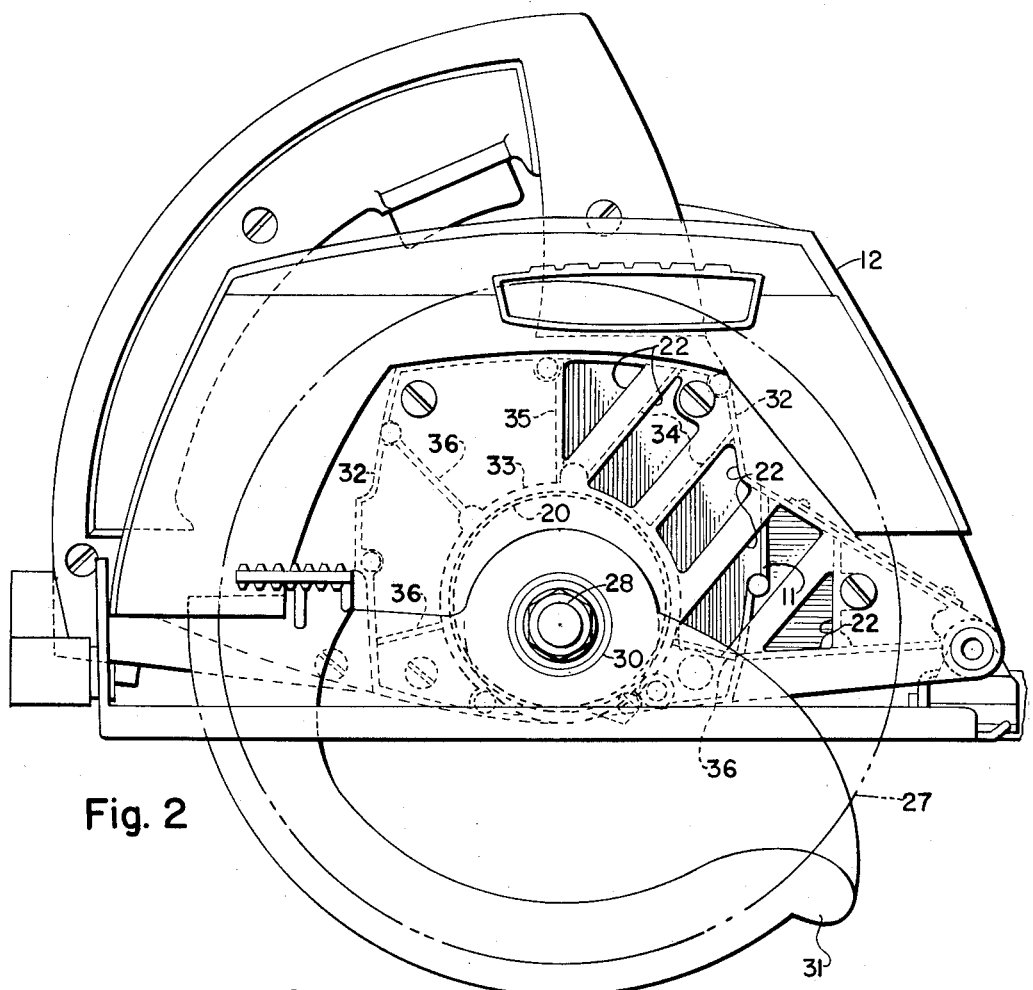
FIG. 2 is a right-hand elevational view of the tool shown in FIG. 1.

Air outlet ports 22 are formed in the stationary blade guard 12 as seen best in FIG. 2.

Meshed with the splined terminal portion 19 of the shaft 16 is a gear 23 secured on a saw arbor 24 journaled at one end in a needle bearing 25 and at the other end in a ball bearing 26 secured in the blade guard 12 which forms a closure for the gear-containing portion 20 to make it grease tight.

A saw blade 27 is held on the saw arbor 24 by a tap-screw 28 threaded into the end of the arbor, which screw draws up on two opposed collars 29 and 30 to clamp the blade 27 therebetween. A movable blade guard 31 covers the lower part of the blade 27 and is arranged to pivot about the axis of the arbor 24 and telescopes within the stationary blade guard 12 to expose the saw blade for cutting.

Figure 4:
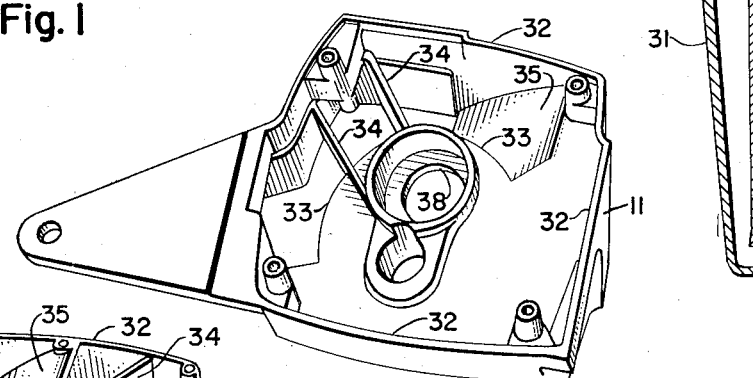
FIG. 4 (sheet 1) is a perspective view of the gear housing portion of the tool shown in FIG. 1.
Figure 5:
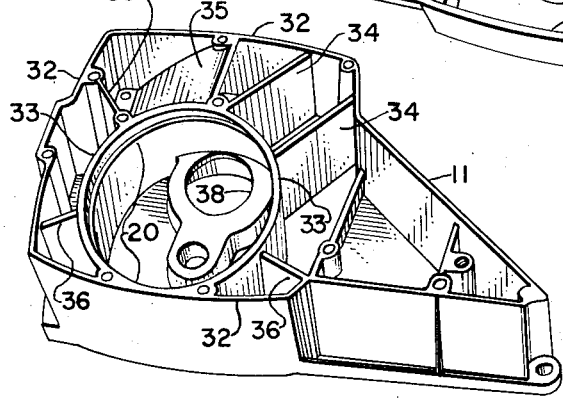
FIG. 5 is another perspective view of the gear housing shown in FIG. 4.

As seen best in FIGS. 4 and 5, the gear housing 11 is formed as a die-casting with outer peripheral wall portions 32 shaped to match similar portions of the motor housing 10 and the blade guard 12 to which it is assembled. The gear-containing portion 20 is formed with a cylindrical wall 33 supported by a plurality of transverse rib members 34, 35, and 36 which connect to the peripheral wall portion 32 as shown. It will be seen that the wall portions 32 and 33 form with the rib members 34, 35, and 36, ducts having directional properties for properly guiding the air supplied by the fan 37 in its passage through the gear housing 11 and for presentation to the aligned air outlet openings 22 in the blade guard 12.

The rib 35 is placed at an angle to provide a laterally directed component to the air flow to create a sweeping action of the air stream in the vicinity of the cutting line of the saw blade 27 to clear away the sawdust at this point. The ribs 34, 35, and 36 also provide a plurality of radial paths of good thermal conductivity and large air-contact area whereby heat generated by the gear friction within the enclosed portion 20 may be readily transferred to the air stream, thus holding the temperature of the gear housing, which is normally the "hot spot" for tools of this type, to an acceptable value.

From the foregoing, it will be perceived that I have provided a single unitary casting which performs the functions of housing a gear transmission, directing an air flow for proper presentation to a cutting tool for clearing away the cuttings, and transferring the heat generated by the gear transmission to the air stream to maintain a limited temperature rise in the gear housing.

Having thus described the nature of the invention, what I claim herein is:

In a fan-cooled electrically-driven tool, a gear housing formed with a gear-containing cavity portion, closures for said cavity portion rendering it grease tight, an outer peripheral wall portion for said gear housing providing a joining edge for securement to adjacent housings, and a plurality of transverse rib members integral with said gear housing and connecting said gear-containing cavity portion with said outer wall portion to form directing vanes for guiding the air from the fan in its passage through the gear housing and to provide heat-dissipating fins for transferring heat from said gear-containing cavity to the air.

References Cited in the file of this patent

UNITED STATES PATENTS

| | | |
|---|---|---|
| 2,488,947 | Vavrik | Nov. 22, 1949 |
| 2,639,737 | Forsberg | May 26, 1953 |
| 2,905,213 | Levine | Sept. 22, 1959 |